April 26, 1949.　　　　W. J. WILDERN　　　　2,468,281
VALVE
Filed April 11, 1945
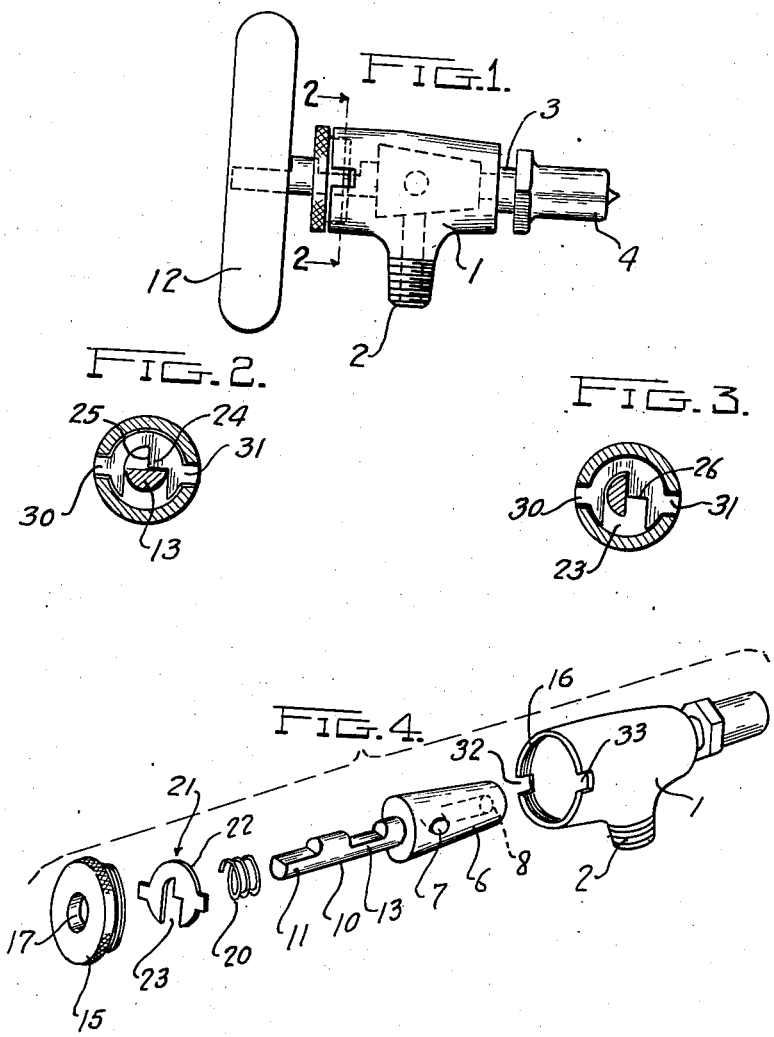
INVENTOR.
William J. Wildern
BY Patented Apr. 26, 1949

2,468,281

UNITED STATES PATENT OFFICE 2,468,281

VALVE

William J. Wildern, Detroit, Mich., assignor to Detroit Brass & Malleable Works, Detroit, Mich., a corporation of Michigan Application April 11, 1945, Serial No. 587,660

1 Claim. (Cl. 251—154)

This invention relates to a valve and it has to do particularly with a valve suitable for controlling the flow of gases or liquids as, for example, the gaseous fuel for gas stoves or heaters or other gas burning equipment.

It has long been the practice to make valves of this kind comprising two main parts, namely, a body or barrel with an internal tapered valve seat and a tapered plug or valve member rotatably mounted on the seat. Ordinarily, it is desirable to limit the rotation of the valve member in the body and while the valve member may be limited to various degrees of angular movement it has, in many instances, been common to limit the rotation to about 90° for a simple off-and-on function. This invention has to do particularly with improved means for so limiting or stopping rotary movement of the valve member in its extreme positions of adjustment.

A quite common construction for limiting the valve movement comprised the insertion of a radially extending pin in the valve member which projected from the valve member and which operated in a slot or recess cut or milled in the valve body. A number of disadvantages to this construction has long been known and yet the structure has persisted due, perhaps, to its apparent simplicity. In some cases, probably after a long period of use the pins have been known to break. This cannot be satisfactorily repaired and the valve has to be discarded. In other cases, the pin rubs on the surface of the body and where the body is made of a material such as brass, small particles are rubbed off and these may get in between the valve member and the seat causing an improper seating and wear or scoring with the danger of causing leakage. Even the manufacture of this structure has its costly phases because of the several operations required such, for example, as the drilling of the hole for the reception of the pin and the hand work required for the insertion of the pin.

It is the aim of the present invention to provide a simple, economical construction capable of manufacture at a low cost and which constitutes an improvement over those devices heretofore known. In the manufacture of this structure, costs are reduced because of the elimination of certain manual operations; a stop structure is provided which is not subject to breakage in ordinary use and which is not liable to grind away the metal so as to release particles which may get into the seat.

A structure made in accordance with the invention is disclosed in the accompanying drawings:

Fig. 1 is a side elevational view of a valve constructed in accordance with the invention showing some parts in dotted lines.

Fig. 2 is a cross sectional view taken on line 2—2 of Fig. 1 showing the stop structure.

Fig. 3 is a view similar to Fig. 2 showing a different position of the parts.

Fig. 4 is a view illustrating the several parts in separated relationship.

The valve body 1 is of any suitable desired type having a screw threaded extension 2 which is an inlet for gas and an outlet extension 3 which may be provided with a suitable jet structure 4. The interior of the valve is provided with a tapered seat for the reception of the tapered valve member or plug 6. This plug has an inlet passage 7 arranged to be moved into and out of alignment with the inlet passage of the extension 2 and an outlet passage 8 which opens to the outlet extension 3.

The valve member has a stem 10 which may be round in overall cross section and it is cut away at its end to provide a D-shape in cross section as illustrated at 11 for reception of a suitable control handle 12. At an intermediate point in its length the stem is cut away to provide a D-shape cross section part 13 which constitutes one of the stop elements.

When the parts are assembled the tapered plug portion 6 is caused to seat in the valve body and a suitable cap 15 is secured to the open end of the valve body as by means of threads 16. The cap has a passage 17 through which the stem extends and in order to hold the plug valve on its seat a coil spring 20 is employed which surrounds the stem and reacts against the tapered plug and the cap 15.

For controlling and limiting the rotary movements of the valve there is an element 21 which may be termed a washer, although it preferably is of open construction. This washer member or stop member fits into the open end of the body as illustrated in Figs. 2 and 3. It preferably has a partially circular peripheral portion 22 which may fit within the body with a nice clearance and it is cut away to provide an open slot 23. The bight portion of this slot contains a segment of metal shown at 24 which has a facet 25 and a facet 26. This washer is disposed preferably between the cap 15 and the spring 20 so that the spring acts directly upon the washer, the washer in turn pressing against the cap 15.

This stop structure or washer structure cooperates with the D-section 13 of the stem and the parts are so constructed that the assembly of the stop member relative to the body can only be made in one way. To this end the stop member has a projection 30 and a projection 31 which fit respectively into notches 32 and 33 in the valve body. The projection 30 and its receiving slot 32 are constructed with desirable dimensions measured circumferentially so as to have a nice operative fit and the projection 31 and its cooperating notch 33 have different dimensions measured circumferentially as indicated in the drawing. While these dimensions may vary, the example illustrated shows the cross dimension of the projection 30 as being 1/8 of an inch while the cross dimension of the projection 31 is 5/32 of an inch. Further, the two projections 30 and 31, and their cooperating notches, are not in alignment with each other. As illustrated the projection 30 and its notch 32 and the projection 31 and its notch 33 are offset, so to speak, at an angle relative to each other. As indicated in the drawing this may be about 5° although this is variable.

By this construction the washer can only be assembled to the valve body in one position. For example, if the washer be rotated on the axis of the valve through 180° the projection 31 would not enter the slot 32. If the washer be rotated on a transverse horizontal so that it is upside down relative to the position shown in Figs. 2 and 3 the projections 30 and 31 are not reversed in position but are adjacent their cooperating slots. However, the angular displacement causes projection 31 to extend relatively upwardly as Fig. 2 is viewed so that there is a total difference of about 10° between the projection 31 and its notch 33. Thus, the washer cannot be assembled in this position. Similarly, if the washer be shifted through 180° by turning the same on a transverse vertical axis, as Fig. 2 is viewed, the projection 31 will not enter the notch 32. Accordingly, the only way the washer can be assembled is in its correct position and in this position the stop facets 25 and 26 and the D-shape section 13 of the valve stem are properly arranged so that manipulation of the valve brings the port 7 into and out of registry with the inlet passage in the extension 2.

When the parts are assembled the D-shape section 13 cooperates with the facets 25 and 26 of the segment 24. Preferably, the slot forming the D-section has an axial dimension greater than the thickness of the washer. Therefore, considerable latitude is provided as indicated in Fig. 1. As a result the segment 24 lies within the milled section with adequate clearance. If the valve and valve seat wear in use so that the valve member shifts further into the valve body the clearance for the segment 24 is adequate to permit this without contact with the stem. Therefore, there is no tendency to shave off metal parts which may get in between the valve seat and the valve plug. The two positions are shown in Figs. 2 and 3.

It will be noted that the D-section 13 abuts against the facet 26 in one position and abuts against the facet 25 in another position. Thus, movement of the valve member is determined by the positions of the facets 25 and 26 and the structure D-section. As illustrated the D-section 13 is cut substantially on the center line of the stem and the apex of the segment 24 lies substantially on the axis of rotation. The movement of the valve is confined to substantially 90° and in one position the valve is off and in the other position the valve is on.

The manufacturing of the structure is simplified as practically all operations may be made by machine. The slots 32 and 33 may be milled into the body; the D-formations 11 and 13 may be formed in the stem by a single milling operation; the stop member 21 may be a stamping. No hand operations are required such, for example, as fitting a pin in a hole in the valve member. The structure is strong and effective although of simple design. The abutments or facets 25 and 26 form substantially abutting areas and the metal of the segment is under compression when acting as a stop there being no shearing action as is the case with the pin.

I claim:

A valve structure comprising, a valve body with an internal seat, a valve member having a valve portion disposed in and turnable in said seat, a cap for the body, an operating stem on the valve body projecting through the cap, the stem having a transverse slot therein located within the cap and providing a stem section substantially of D-shape in cross section, a washer-like stop member having a notch therein positioned at the location of the transverse slot or stem, a segmentally shaped projection extending into the slot and providing facets for engagement with the flat side of the D-shaped stem section to limit the rotary movements of the valve member, the valve body having substantially oppositely disposed notches therein and the stop member having substantially oppositely disposed projections received in said notches, characterized in that the circumferential dimensions of one notch and its cooperating projection are greater than the corresponding dimensions of the other notch and its cooperating projection and further characterized in that the center line through one notch and projection is angularly displaced relative to the center line of the other notch and projection.

WILLIAM J. WILDERN.

REFERENCES CITED

The following references are of record in the file of this patent:

UNITED STATES PATENTS

| Number | Name | Date |
| --- | --- | --- |
| 1,663,427 | Uhl | Mar. 20, 1928 |
| 2,203,395 | Schoenberger | June 4, 1940 |
| 2,405,476 | Weatherhead | Aug. 6, 1946 |

FOREIGN PATENTS

| Number | Country | Date |
| --- | --- | --- |
| 173,528 | Switzerland | 1935 |